Dec. 10, 1963 W. R. BROWNLEE 3,114,037
MEASURING AND CONTROLLING METHOD AND APPARATUS
Filed Jan. 7, 1957 2 Sheets-Sheet 1

INVENTOR.
WILLIAM R. BROWNLEE
BY Arthur H. Swanson
ATTORNEY.

Dec. 10, 1963     W. R. BROWNLEE     3,114,037
MEASURING AND CONTROLLING METHOD AND APPARATUS
Filed Jan. 7, 1957     2 Sheets-Sheet 2
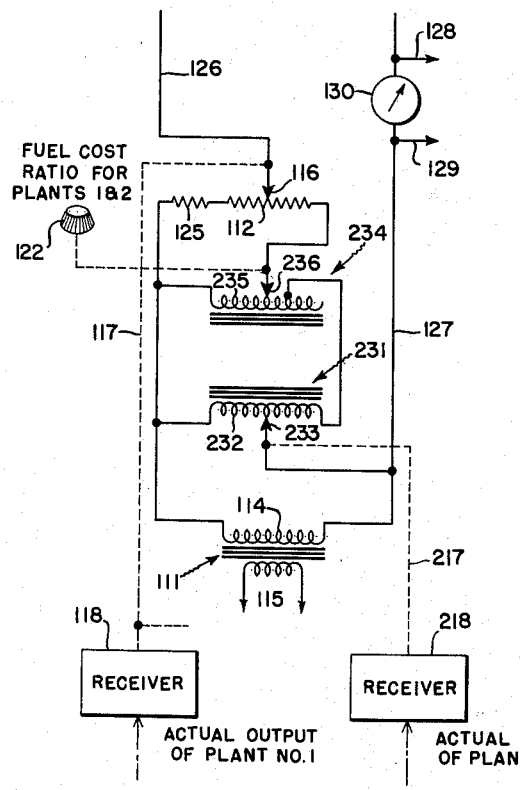
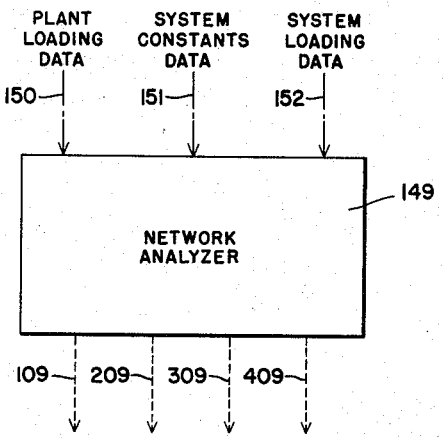
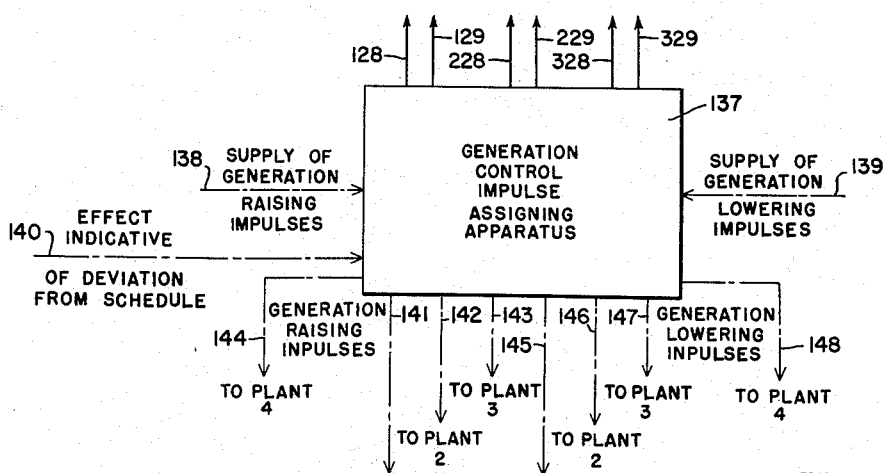
INVENTOR.
WILLIAM R. BROWNLEE
BY
ATTORNEY.

United States Patent Office 3,114,037
Patented Dec. 10, 1963

3,114,037
MEASURING AND CONTROLLING METHOD
AND APPARATUS
William R. Brownlee, 780 Montgomery Drive,
Birmingham 9, Ala.
Filed Jan. 7, 1957, Ser. No. 632,839
1 Claim. (Cl. 235—185)

The present invention relates generally to methods and apparatus for use in assigning the loads to the interconnected generating plants of an electric power generating and distributing system in such a manner as to provide the most economical operation of the system. Specifically, the invention relates to methods and apparatus of the foregoing type for assigning the loads to the system plants in accordance with the incremental costs of delivered energy for the plants so as to coordinate the incremental generating costs and incremental transmission losses in the system to the end of securing the most economical combination of plant loadings.

More specifically, the present invention pertains to methods and apparatus of the stated type for detecting deviation from economic balance between the system plants in arriving at a measure of the incremental costs of delivered energy for the plants and an optimum plant loading schedule.

A general object of the present invention is to provide an improved method and apparatus for use in assigning the loads to the interconnected generating plants of an electric power generating and distributing system in accordance with the incremental costs of delivered energy for the plants so as to coordinate the incremental transmission losses and incremental generating costs in the system to the end of securing the most economical loading of the system plants and the most economical operation of the system.

A specific object of the invention is to provide a novel method and apparatus of the above type for producing a measure of the incremental transmission loss between the two plants of each of selected pairs of the system plants as a function of solely the phase angle between the bus voltages of the two plants and the constant ratio of reactance to resistance of the equivalent path joining the two plants. A more specific object of the invention is to provide a novel method and apparatus of the type just specified for effecting a comparison, for each of selected pairs of the system plants, between a measure of the incremental generating costs for the two plants of the pair and the foregoing measure of the incremental transmission loss between the two plants, said loss and cost measures being equal when the two plants of the pair are in economic balance and have equal incremental costs of delivered energy.

A still more specific object of the invention is to provide a novel method and apparatus of the foregoing type for detecting, by means of said comparisons, any deviation between the loss and cost measures for the two plants of each pair, and for producing a deviation effect representative of any such deviation, and hence representative of any deviation from economic balance between the two plants of the pair, and of the incremental cost of delivered energy for one of the two plants of the pair relative to that of the other.

An even more specific object of the invention is to provide a novel method and apparatus as specified above for producing deviation effects of the type set forth which are functions of the amount, if any, that the generation of each plant should be changed with respect to the generation of a chosen reference plant in order to provide the most economical combination of plant loadings, for the existing system load conditions.

A still more specific object of the invention is to provide a novel method and apparatus as just specified for controlling the plant outputs automatically in accordance with the aforementioned deviation effects so as to maintain an optimum generating schedule and to cause the plants to be loaded automatically in the manner necessary to provide the most economical operation of the system at substantially all times and for all system load conditions within the operating range.

A further specific object of the invention is to provide a novel method and apparatus of the foregoing type, in accordance with which the foregoing measure of the incremental transmission loss between the plants of each of the selected pairs of plants is produced as a linear function of the phase angle between the bus voltages of the corresponding plants.

A still further specific object of the invention is to provide a novel method and apparatus for determining when the two plants of each of pairs of the system plants are in economic balance by comparing a measure of the incremental generating costs for the two plants to a measure of the incremental transmission loss between the two plants which is a linear function of the phase angle between the bus voltages of the two plants and which is equal to said cost measure when the two plants are in economic balance.

Another specific object of the invention is to provide a novel method and apparatus for detecting deviation from economic balance between the two plants of each of pairs of the system plants by comparing a measure of the incremental generating costs for the two plants to a measure of the incremental transmission loss between the two plants which is a function of solely the phase angle between the bus voltages of the two plants and the constant ratio of the reactance to the resistance of the equivalent path interconnecting the two plants, said cost and loss measures being equal when the two plants are in economic balance.

It is also a specific object of the invention to provide novel apparatus as specified above for producing the foregoing measure of the incremental transmission loss between a pair of plants in accordance with an improved relationship between such loss and the corresponding phase angle and reactance to resistance ratio, this relationship providing an accurate measure of such loss notwithstanding the presence of an intermediate plant on the path interconnecting said pair of plants.

It has been recognized in the past that the maintenance of an optimum generating or loading schedule in a power system, for maintaining economical system operation and a minimum cost of total delivered energy in the system, requires the continual coordination of the system generating costs and transmission losses. To this end, various methods have been developed in the past for obtaining system transmission loss constants, usually referred to as B-type constants, and arrangements have been described for applying these constants to system load scheduling or dispatching problems. These applications have usually involved the comparison of incremental fuel costs and incremental transmission losses in arriving at the optimum generating schedules to be followed, the incremental transmission losses being calculated on the basis of the previously determined B-type constants mentioned above.

As is well known to those skilled in the art, the foregoing previously known and used methods of calculating and coordinating incremental costs and losses for arriving at optimum generating schedules are subject to numerous significant disadvantages. These disadvantages are due, primarily, to the frequently unsatisfactory nature of the B-type constants, to the practical difficulties encountered in obtaining such constants, and to the complexity of the computations involved in applying the constants to the problem and in solving the resulting simultaneous equations.

I have discovered, however, a novel method for determining incremental transmission losses which is not subject to the above-noted disadvantages associated with the B-type loss constants and their use in obtaining optimum generating schedules. Specifically, I have discovered that a unique relationship exists between the incremental transmission loss between two points and the phase angle between the voltages at these points. More specifically, I have discovered that the incremental transmission loss $$\left(\frac{dL}{dP}\right)$$

between two plants can be expressed as a function of solely the phase angle ($\theta$) between the bus voltages of the two plants and the constant ratio of reactance to resistance (K) of the equivalent path joining the two plants.

This unique relationship has been described, developed, and explained in my paper entitled "Co-ordination of Incremental Fuel Costs and Incremental Transmission Losses by Functions of Voltage Phase Angles" which appeared at pages 529 to 533 of Part IIIA, Power Apparatus and Systems, of volume 73 of the AIEE Transactions. In that paper, I have shown that the following incremental transmission loss equation properly defines the incremental transmission loss between two plants in terms of solely the factors noted and defined above:

(A) $$\frac{dL}{dP}=\frac{2 \sin \theta}{K \cos \theta + \sin \theta}$$

I have also shown in the above-mentioned paper that this unique expression for incremental transmission loss can be utilized to advantage in a practical comparison method which I have developed for determining, in an accurate but relatively simple manner, when the plants of a system, and hence the entire system, are in economic balance, and hence when the system is operating at a minimum cost of total delivered energy. Specifically, I have shown in said paper that the Plants 1 and 2 of any given pair of plants of a system will have the same incremental cost of delivered energy at any given point, and hence will be in economic balance, when the following economic balance equation, relating the incremental generating costs and incremental transmission losses for the two plants, is satisfied:

$$\frac{dF_2/dP_2}{dF_1/dP_1}=\frac{K \cos \theta + \sin \theta}{K \cos \theta - \sin \theta}$$

wherein:

$dF_1/dP_1$ and $dF_2/dP_2$ are the incremental generating costs for Plants 1 and 2, respectively, K is the above reactance-resistance ratio of the transfer impedance or equivalent path between the two plants, and $\theta$ is the phase angle by which the bus voltage at Plant 1 leads the bus voltage at Plant 2.

As pointed out in said paper, the foregoing balance equation for a pair of plants compares the incremental transmission loss ratio between the plants, as determined by my foregoing incremental transmission loss equation, with the incremental generating cost ratio for the plants. Thus, when this balance equation is satisfied, the corresponding plants operate at the same incremental cost of delivered energy at any given point, and are in economic balance. Further, when all pairs of the system plants are in such economic balance, the entire system is in economic balance.

The foregoing phase angle loss computing and comparison method for determining when the pairs of plants of a system are in economic balance, and when the entire system is in balance, is, and is described in said paper as being, a method which was developed for use in simplifying the adequate planning of power system expansion.

I have discovered, however, that this method also constitutes a highly effective, advantageous, and practical tool of relative simplicity for use in assigning the loads to the plants of an actual, operating system so as to provide optimum generating or loading schedules and economical system operation under the actual system loading and operating conditions, inasmuch as the practice of this method requires a knowledge of only three readily obtainable factors: namely, plant incremental generating costs, constant reactance to resistance ratios, and plant bus voltage phase angles. Moreover, the use of this method in the above manner does not involve the disadvantages encountered with the use of the previously known methods employing the B-type loss constants, since the present method is not subject to the deficiencies inherent in the prior methods. These factors, together with the basic concepts involved in my comparison method, make this method a highly desirable and practical one for use in apparatus invented by me for automatically determining when the plants of an operating system are in economic balance, for computing what changes, if any, in the plant loadings are needed to provide the most economical combination of plant loadings, and for automatically controlling the loading of the plants in accordance with the computed optimum loading data.

Accordingly, in my copending application Serial No. 632,917, now Patent No. 2,861,197 of November 18, 1958, filed on even date herewith, I have disclosed and claimed novel apparatus invented by me which is operative in accordance with the foregoing incremental transmission loss and balance equations and comparison method to produce effects representative of the incremental transmission loss ratio for a pair of interconnected generating plants, to detect deviation from economic balance between pairs of such plants, and to assign the loads to such plants in relation to the incremental costs of delivered energy for the plants.

As explained in the aforementioned application, the nature of the load assigning method and apparatus disclosed therein makes it desirable, when selecting the pairs of plants between which the incremental costs and losses are to be compared, to choose, for the plants of each pair, plants which are adjacent electrically, so as to minimize the influence of intervening plants on the computed incremental losses. I have discovered, however, a unique expression which accurately relates the incremental transmission loss between two plants to the phase angle between the bus voltages of the plants notwithstanding the presence of intermediate generation along the path interconnecting the two plants.

Specifically, this new expression for the incremental transmission loss between two plants takes into account the effect or influence exerted on the incremental loss by a typical intermediate generating plant. In other words, this expression is based on the assumption that there is an intermediate plant on the line connecting the two plants between which it is desired to determine the incremental transmission loss, and the expression is therefore arranged to provide a measure of the true incremental transmission loss between said two plants, taking into account the influence of an intermediate plant.

This novel two-step or two-section expression or equation for the incremental transmission loss between two plants is derived and developed from my foregoing simple or single-step loss equation by applying the latter in two successive steps in the manner shown in Appendix I of my aforementioned paper, wherein the derivation of this two-step equation is set forth. As shown in said paper, this equation is:

(B) $$\frac{dL}{dP}=\frac{4K \tan \frac{1}{2}\theta}{(K+\tan \frac{1}{2}\theta)^2}$$

wherein $$\frac{dL}{dP}$$

is the incremental transmission loss between the two plants in question which is to be determined by means of the equation, and wherein $\theta$ and K are the respective phase angle between the plant bus voltages and the constant ratio of reactance to resistance for equivalent path between the plants, all as for the single-step loss equation as set forth hereinbefore. It is apparent that this two-step loss equation, like its single-step forerunner, provides a measure of the incremental transmission loss in terms of or as a function of solely the phase angle $\theta$ and the constant K.

I have found that the procedure on which this two-step equation is based, of treating each pair of plants as if there were one intermediate plant on a direct line between them, renders the equation adequately accurate for use in calculating the incremental transmission loss between practically any two plants of the system, since it provides accurate results for both closely and widely spaced plants, either with or without intermediate or intervening generation on the line between them. In the case of plants which are near to each other, the phase angles are relatively small, so that there is practically no difference in the loss values obtained by the single-step and two-step equations. The larger phase angles are most likely to occur for plants with greater separation and hence with intervening plants, and for these the two-step equation is closely applicable.

The foregoing two-step loss equation, like the foregoing original one-step loss and comparison equations and method, is, and is described in the aforementioned paper as being, an expression which was developed for use in simplifying the adequate planning of power system expansion. I have discovered, however, that this expression or equation constitutes a practically useful and desirable tool for use in improved apparatus which I have invented and am disclosing and claiming herein for automatically determining deviation from economic balance between the plants of an actual operating system, such apparatus being especially useful for assigning the plant loads in such an actual system to provide the most economical combination of plant loadings.

An important feature of the two-step loss equation in this connection is that economic plant loading apparatus operating in accordance with this equation does not require that the plants between which the economic balance comparison is effected be electrically close together. Accordingly, I have discovered that economic load assigning apparatus operating in accordance with this equation, as does one form of the apparatus according to the present invention, can be and desirably is arranged to compare the incremental generating costs and transmission losses between one plant, chosen as the reference plant, and each other plant of the system. In other words, the use of the foregoing two-step loss equation permits each generating plant in the system to be compared directly with a single chosen reference plant, since the greater distances between compared plants resulting from this comparison method do not produce consequential inaccuracies when the two-step loss equation is employed.

Since economic load assigning apparatus which is constructed and arranged to operate in accordance with the foregoing two-step loss equation is operable in accordance with the desirable direct plants-to-reference plant economic balance comparison method just described, and hence operates with improved accuracy and flexibility, and with a smaller amount of equipment, in comparison to the apparatus of my aforementioned copending application, it is apparent that the first mentioned apparatus represents a practical and significant improvement over that of said copending application. Accordingly, as stated hereinbefore, it is one of the objects of the present invention to provide novel economic balance deviation detecting and load assigning apparatus wherein the measure of the incremental transmission loss between the plants of each pair is made in accordance with the foregoing improved relationship or two-step equation between such loss and the corresponding phase angle and reactance to resistance ratio.

I have also discovered, moreover, an improved, novel comparison method for determining when the two plants of a pair are in economic balance and hence have equal incremental cost and loss ratios and equal incremental costs of delivered energy, for detecting deviation from economic balance between such plants, and for use in assigning the loads to the plants in accordance with their incremental costs of delivered energy. This improved comparison method is characterized by the use of an incremental transmission loss ratio which is a predetermined linear function of the corresponding phase angle $\theta$.

Specifically, in accordance with this improved comparison method, an incremental transmission loss ratio for two plants, which is a predetermined linear function of the phase angle $\theta$ for the two plants, is compared to an incremental generating cost ratio for the two plants which is equal to the incremental transmission loss ratio when the two plants are in economic balance. Any deviation or difference between these ratios represents a corresponding deviation from economic balance between the two plants, and a corresponding deviation from equal incremental costs of delivered energy for the two plants.

I have derived two novel economic comparison or balance expressions or equations, according to this novel comparison method, wherein the incremental transmission loss ratio term is a linear function of $\theta$, and wherein the incremental generating cost ratio term is selected and arranged to be equal to the loss ratio term when the two plants involved have equal incremental delivered energy costs at any given point and are in economic balance. Since this novel comparison method is applicable for use where the incremental transmission losses are based on either of the foregoing single-step and two-step loss equations, one of the above novel economic balance equations is based on the single-step loss equation, while the other is based on the two-step loss equation. For either of these improved economic balance or comparison equations, the cost and loss ratios are equal, and the equation is satisfied, when the two plants involved have the same incremental cost of delivered energy at any given point, and hence are in economic balance.

Specifically, the improved economic balance equation based on the single-step loss equation is:

$$\frac{dF_2/dP_2 - dF_1/dP_1}{dF_2/dP_2} = \frac{2 \tan \theta}{K + \tan \theta} \quad (1)$$

wherein:

$dF_1/dP_1$ and $dF_2/dP_2$ are the incremental generating costs for two plants, 1 and 2, respectively, and K and $\theta$ are the foregoing respective constant ratio and bus voltage phase angle for the two plants.

This equation is obtained by rewriting the foregoing single-step incremental transmission loss equation (A)

$$\frac{dL}{dP} = \frac{2 \sin \theta}{K \cos \theta + \sin \theta}$$

as:

$$\frac{dL}{dP_{1-2}} = \frac{2 \tan \theta}{K + \tan \theta}$$

and by combining this latter equation with a novel economic balance equation $$\frac{dF_2/dP_2 - dF_1/dP_1}{dF_2/dP_2} = \frac{dL}{dP_{1-2}}$$

which is obtained by rearranging the basic economic balance Equation 11 of said paper $$\frac{dF_2/dP_2}{dF_1/dP_1} = \frac{1}{1 - dL/dP_{1-2}}$$

By assigning a series of values to $\theta$ in the right-hand or loss ratio term of the foregoing improved balance Equation 1, and by then plotting a series of curves of the value of the loss ratio term versus $\theta$, each curve being for a different arbitrarily assigned value of K, it is seen that this loss ratio term is a linear function of $\theta$, as is desired. Specifically, it is shown by such plotted curves that this loss ratio term can be expressed as follows:

$$\frac{2 \tan \theta}{K+\tan \theta} = \frac{0.0385}{K+0.58}\theta$$

Since the right-hand term of this last equation is clearly a linear expression or function of $\theta$ for any given value of the constant K, it is apparent that the incremental transmission loss ratio term of the above balance Equation 1 is a linear function of $\theta$.

While the equation immediately above naturally represents an approximation of the value of the corresponding loss ratio term, this approximation gives results which, for any value of $\theta$ within the range normally encountered in the usual system, such as a range of 0–60°, for example, are sufficiently accurate to be entirely suitable for the present purposes.

Accordingly, the above single-step linear balance Equation 1 can be written (where $\theta$ is expressed in electrical degrees):

$$\frac{dF_2/dP_2 - dF_1/dP_1}{dF_2/dP_2} = \frac{0.0385}{K+0.58}\theta \qquad (2)$$

Thus, when the value of the left-hand, incremental generating cost ratio term of Equation 2 is equal to the incremental transmission loss ratio value expressed by the righthand term as a linear function of $\theta$, the two plants involved are in economic balance.

As previously noted, I have also derived a similar improved economic balance equation which is based on the foregoing two-step loss equation. This linear two-step balance equation is:

$$\frac{dF_2/dP_2 - dF_1/dP_1}{dF_2/dP_2 + dF_1/dP_1} = \frac{2K \tan \frac{1}{2}\theta}{K^2 + \tan^2 \frac{1}{2}\theta} \qquad (3)$$

wherein all of the symbols have the same definitions as given hereinbefore. This equation is obtained in a manner which is similar to that in which the above linear single-step balance Equation 1 is obtained.

Specifically, Equation 3 is obtained by combining the foregoing two-step loss equation (B) with a novel economic balance equation $$\frac{dF_2/dP_2 - dF_1/dP_1}{dF_2/dP_2 + dF_1/dP_1} = \frac{dL/dP_{1\text{-}2}}{2-dL/dP_{1\text{-}2}}$$

which is obtained by rearranging the foregoing basic balance Equation 11 of said paper.

By assigning a series of values to $\theta$ in the right-hand or loss ratio term of balance Equation 3, and by then plotting a series of curves of the value of the loss ratio term versus $\theta$, each curve being for a different arbitrarily assigned value of K, it is seen that this loss ratio term is a linear function of $\theta$, as is desired. Specifically, it is shown by such plotted curves that this loss ratio term can be expressed as follows:

$$\frac{2K \tan \frac{1}{2}\theta}{K^2+\tan^2 \frac{1}{2}\theta} = \frac{0.0184K}{K^2+0.17}\theta$$

Since the right-hand term of this last equation is clearly a linear expression or function of $\theta$ for any given value of the constant K, it is apparent that the incremental transmission loss ratio term of the above balance Equation 3 is a linear function of $\theta$.

While the equation immediately above naturally represents an approximation of the value of the corresponding loss ratio term, this approximation gives results which, for any value of $\theta$ within the range normally encountered in the usual system, such as a range of 0–60°, for example, are sufficiently accurate to be entirely suitable for the present purposes.

Accordingly, the above two-step linear balance Equation 3 can be written:

$$\frac{dF_2/dP_2 - dF_1/dP_1}{dF_2/dP_2 + dF_1/dP_1} = \frac{0.0184K}{K^2+0.17}\theta \qquad (4)$$

Thus, when the value of the left-hand, incremental generating cost ratio term of Equation 4 is equal to the incremental transmission loss ratio value expressed by the right-hand term as a linear function of $\theta$, the two plants involved are in economic balance.

Summarizing the foregoing with respect to the last mentioned discovery, I have discovered a novel comparison method for determining when two plants of a pair are in economic balance, and have derived two novel balance equations for this method which express the incremental transmission loss ratio for the two plants involved as a linear function of the corresponding phase angle $\theta$. One of these linear balance equations, shown above as Equations 1 and 2, is based on the above single-step increment transmission loss equation, and is advantageously employed in those cases where the two plants involved are connected by a relatively long transmission path with no intervening generation. The other of these linear balance equations, shown above as Equations 3 and 4, is based on the above two-step incremental transmission loss equation, and is advantageously employed in all other cases: namely, those involving plants which are electrically close together, with or without intervening generation between them, and those involving plants which are widely separated electrically and have intervening generation along the path connecting them.

This novel comparison method with loss ratios linearized with respect to the phase angles represents a practical and significant improvement over the comparison method employed in the apparatus of my aforementioned copending application, since the present method provides improved accuracy of operation with less complex comparison equipment than that required with the method of said copending application. Accordingly, as stated hereinbefore, it is an object of the present invention to provide this improved method for determining when the plants of pairs of the system plants are in economic balance, for detecting deviation from economic balance between such plants, and for providing deviation effects representing the relative incremental delivered energy costs for the plants for use in assigning the plant loads in the most economic manner.

In addition to discovering the foregoing novel linear comparison method, I have invented novel apparatus for carrying out this method in accordance with the foregoing linear balance or comparison equations, for both single-step and two-step operation. As will be apparent, this apparatus represents a practical and significant improvement over the apparatus of said copending application, since the present apparatus provides improved accuracy and flexibility of operation while being appreciably less complex than that of said copending application. Accordingly, as stated hereinbefore, it is an object of the present invention to provide such novel apparatus, producing a measure of the incremental transmission loss between the two plants of pairs of system plants as a linear function of the corresponding phase angle, for determining when the plants are in economic balance, for detecting deviation from economic balance between the plants, and for providing deviation effects representing the relative incremental delivered energy costs for the plants for use in assigning the plant loads in the most economic manner.

In accordance with the foregoing, it is an object of the present invention to provide novel apparatus as specified hereinbefore which is operative in accordance with one or both of the foregoing two-step loss expression and linear balance or comparison method to determine when the two plants of each of chosen pairs of system plants are in economic balance and have equal incremental costs of delivered energy, and to detect deviation from economic balance between the plants and produce deviation effects representative of the relative incremental costs of delivered energy for the plants for use in assigning the plant loads or outputs to provide the most economical combination of plant loadings.

To the end of fulfilling the foregoing and other desirable objects of the present invention, apparatus provided in accordance with the invention derives a separate measure of the incremental transmission loss between a selected one of the system generating plants, chosen as a reference plant, and each of the other system generating plants whose operation is to be determined by the apparatus. Each of these measures of the incremental transmission loss between a plant and the reference plant is advantageously expressed in the form of the incremental transmission loss ratio for the reference plant and the particular other plant involved. Moreover each of these ratios is a function of solely the constant ratio of the reactance to the resistance of the equivalent path interconnecting the reference and other plant, and the phase angle between the bus voltages of these two plants, an effect representative of this phase angle being supplied to the apparatus by means of telemetering from the plants, by means of a simplified network analyzer, or by means of manual adjustments based on the above or on other data obtained from the operation of the system.

In accordance with one aspect of the invention, each of the foregoing incremental transmission loss ratios is a linear function of the corresponding phase angle. In accordance with another aspect of the invention, each of the incremental transmission loss ratios is a function of the corresponding phase angle and reactance-resistance ratio on the basis of the two-step incremental transmission loss expression set forth hereinbefore.

The incremental transmission loss ratio for each plant and the reference plant is effectively compared to the incremental generating cost ratio for the two plants, this cost ratio being determined on the basis of plant loading information supplied to the apparatus together with data as to the fuel and other generating costs at the two plants, and being equal to the incremental transmission loss ratio for the two plants when the incremental transmission losses and generating costs for the two plants are in balance, and hence when the two plants are in economic balance. The result of this comparison of the incremental costs and losses for the two plants is a deviation effect or signal which is representative of deviation from economic balance between the plants, and inequality between the incremental costs of delivered energy for the plants. Moreover, each of these deviation signals is a function of the relative incremental delivered energy costs for the corresponding plant and the chosen reference plant, and is a function of the amount, if any, that the generation of the corresponding plant should be raised or lowered with respect to the chosen reference plant in order to provide the most economical combination of plant loadings and the minimum cost of delivered energy in the system.

These deviation signals all approach zero value when economical loading and economical system operation are achieved and the incremental delivered energy costs of the plants approach equality. Accordingly, these signals can be applied to deviation-from-balance indicators, and employed to permit economic loadings to be assigned, established, and maintained, in accordance with the incremental costs of delivered energy for the plants, through the medium of manual control of the plant outputs.

Further, the aforementioned deviation signals can be applied to an automatic plant load control portion, and thus utilized to assign and control the plant loadings or outputs automatically as necessary to maintain economic balance between the plants, the economical loading thereof, and the most economical operation of the system, under the various system load conditions which present themselves.

A better understanding of the present invention may be had from the following detailed description of apparatus embodying the invention, which description is to be read in connection with the accompanying drawings, wherein:

FIG. 2 is a schematic circuit diagram of a portion of a modification of the FIG. 1 apparatus according to the invention;

FIG. 3 is a block type circuit diagram of control impulse assigning apparatus useful with the apparatus of FIG. 1 or FIG. 2; and FIG. 4 is a block type circuit diagram of a portion of a modified form of the apparatus of either FIG. 1 or FIG. 2.

Figure 1:
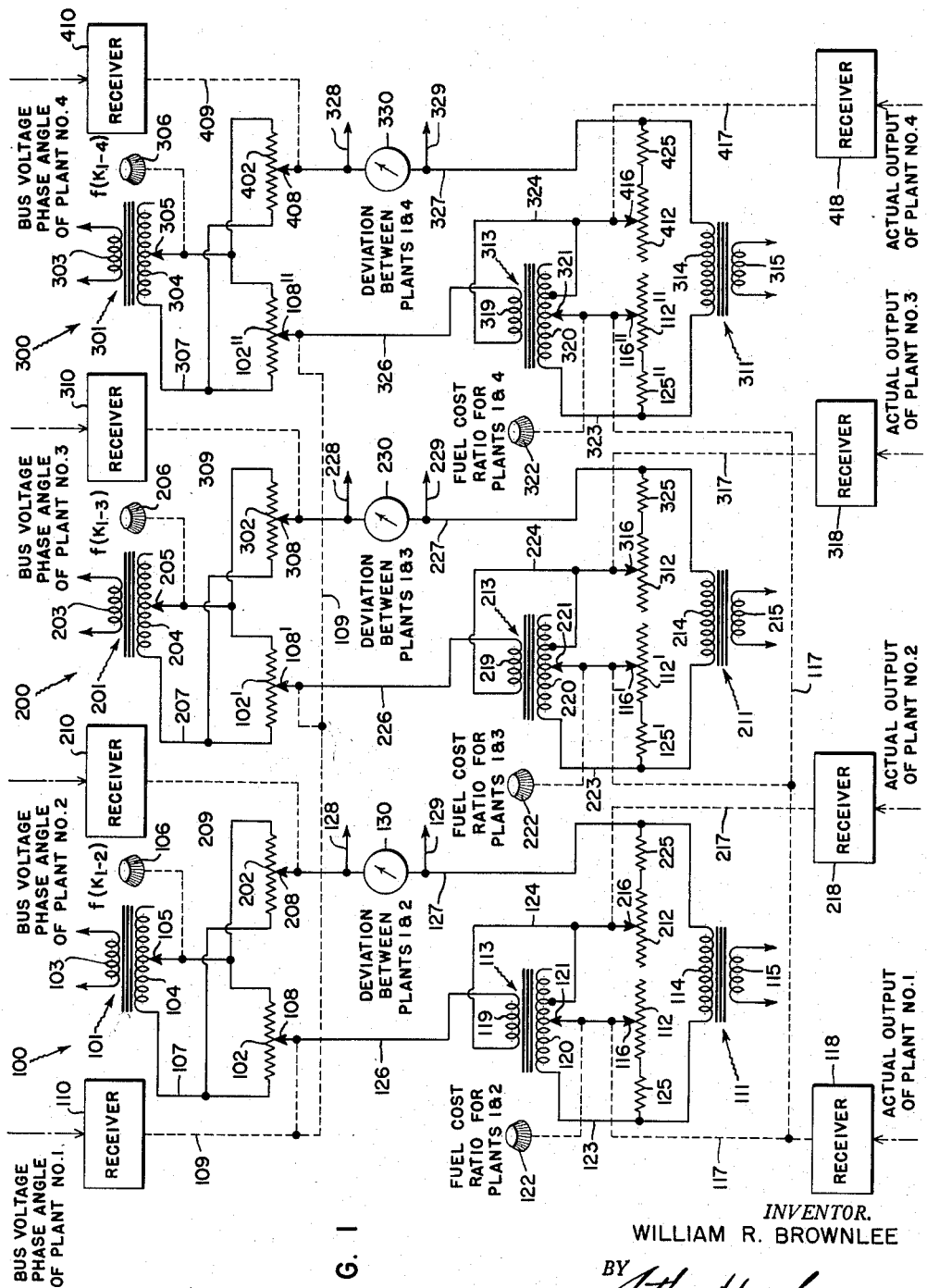
FIG. 1 is a schematic circuit diagram of economic balance detecting and economic load assigning apparatus embodying the present invention.

*General Description of the FIG. 1 Apparatus*

The economic balance deviation detecting and indicating, or economic load assigning, apparatus embodiment of the invention as illustrated in FIG. 1 has been shown as an arrangement for providing economic balance deviation indications for a typical electric power generation and distribution system, not shown, having four interconnected generating plants. It is to be understood, however, that the power system with which the illustrated apparatus is used could well have more or less than four plants, and/or could well have additional plants which, for one or another reason, are not taken into account by the apparatus, and are not subject to the economic loading data provided thereby. However, for simplicity of description and explanation, it will be assumed herein that the power system whose plant loadings are to be controlled in accordance with the economic balance deviation signals produced by the FIG. 1 apparatus includes only said four plants, and that all of these plants are represented in the apparatus and are to have their generation controlled according to an optimum or economic generating or loading schedule as assigned or dictated by the deviation signals produced by the apparatus.

The apparatus of FIG. 1 includes an economic balance measuring and computing portion, and balance deviation indicating means. The computing portion or computer of the apparatus operates in accordance with the improved two-step transmission loss and linear economic balance comparison expressions or equations of the invention as set forth hereinbefore, and includes three identical sections 100, 200, and 300. Section 100 computes the incremental transmission loss ratio for Plants No. 1 and No. 2, Plant 1 being the chosen reference plant. Section 100 also compares this incremental transmission loss ratio with the incremental generating cost ratio for Plants 1 and 2. The results of this comparison appear in the output of computing section 100 as a deviation signal representing any deviation from economic balance between Plants 1 and 2.

Similarly, computing section 200 of the computing portion of the apparatus computes the incremental transmission loss ratio for Plant 3 and reference Plant 1 of the system, and compares this ratio with the incremental generating cost ratio for Plants 1 and 3. The results of this comparison appear in the output of computing section 200 as a signal representative of any deviation from economic balance between Plants 1 and 3.

In like manner, computing section 300 computes the incremental transmission loss ratio for Plant 4, and reference Plant 1, and compares this ratio with the incremental generating cost ratio for these two plants. The results of this comparison appear in the output of section 300 as a signal representative of any deviation from economic balance between Plants 1 and 4.

By maintaining the plant loadings or outputs at the values necessary to maintain the values of the above three deviation signals as close to zero as possible, all possible pairs of the system plants, and hence the entire system, are maintained substantially in economic balance, as will be discussed in more detail hereinafter.

For the purpose of facilitating the following detailed description of the apparatus, the reference characters employed to denote the components associated with Plant 1 are in the 100 series, the reference characters for the components associated with Plant 2 are in the 200 series, and so on. Similarly, the components included in computing section 100 but not individual to any one plant are represented by reference characters in the 100 series, the equivalent components of computing section 200 are represented by reference characters in the 200 series, and so on. In each case, the same component appearing in each section has been designated by the same basic reference number but in the appropriate hundreds series.

Since the computing sections 100, 200, and 300 are identical to each other in structure, and perform identical loss computing and balance determining functions for their respective plants relative to refeernce Plant 1, the construction and operation of only the section 100 will be described in detail herein, it being understood that this description applies as well to the sections 200 and 300.

*Description of Section 100*

The computing section 100 computes and compares the incremental transmission loss and incremental generating cost ratios for Plants 1 and 2 in accordance with the two-step linear economic balance comparison Equations 3 and 4 as set forth hereinbefore. Accordingly, computing section 100 is operative to relate the phase angle $\theta_{1-2}$ between the bus voltages of Plants 1 and 2 with the constant reactance to resistance ratio $K_{1-2}$ of the equivalent path joining Plants 1 and 2 to provide an effect or signal which is representative of the right-hand, incremental transmission loss ratio term of Equation 3, with ratio, with respect to Plants 1 and 2, is:

$$\frac{2K_{1-2} \tan \frac{1}{2}\theta_{1-2}}{K_{1-2}^2 + \tan^2 \frac{1}{2}\theta_{1-2}}$$

Specifically, computing section 100 is arranged to provide a loss ratio signal which is a linear function of $\theta_{1-2}$ in accordance with the above loss ratio, and which has a value which is proportional to the value of the above ratio for the existing values of $\theta_{1-2}$ and $K_{1-2}$. Therefore, the value of this loss signal is proportional to the value of the right-hand term of Equation 4, which term, with respect to Plants 1 and 2, is:

$$\frac{0.0184 K_{1-2}}{K_{1-2}^2 + 0.17} \theta_{1-2}$$

*Computation of Loss Ratio*

To the end of providing a signal which is a measure of the incremental transmission loss ratio for Plants 1 and 2, and which has a value which is proportional to the value of the above numerical expression for this loss ratio, section 100 includes an adjustable voltage source in the form of an adjustable transformer 101 and adjustable slidewire resistors 102 and 202. The output voltage of the transformer 101 is arranged to be adjusted in accordance with the function of the existing value of the constant $K_{1-2}$ shown in the above numerical expression, while the resistors 102 and 202 are arranged to be adjusted in accordance with the bus voltage phase angles of Plants 1 and 2 so as to produce an effect for modifying the transformer output voltage in accordance with the actual value of $\theta_{1-2}$.

Specifically, the transformer 101 includes a primary winding 103 and a secondary winding 104 having an adjustable slider contact 105. The primary winding 103 is arranged to be connected to a suitable source of A.C. voltage, not shown. The contact 105 is arranged to be manually adjusted along the winding 104 by means of a knob 106. Thus, the adjustable voltage output of the transformer 101 appears between the contact 105 and a conductor 107 which is connected to the left-hand end of the winding 104.

The variable output voltage or signal of the transformer 101 is applied to the resistors 102 and 202 in parallel. To this end, the left-hand end terminals of the resistors 102 and 202 are connected to the conductor 107, while the right-hand end terminals of these resistors are connected to the contact 105. Accordingly, the signal appearing across the resistors 102 and 202 is arranged, as by the proper positioning of the knob 106, to have a value which is proportional to the foregoing function of the existing value of the constant $K_{1-2}$.

For providing from the signal across the resistors 102 and 202 the desired loss ratio signal varying linearly with $\theta_{1-2}$, the resistors 102 and 202 are provided with respective slider contacts 108 and 208 which are arranged to be adjusted in accordance with the difference between the phase angles of the bus voltages of Plants 1 and 2, hence in accordance with the actual value of $\theta_{1-2}$. Specifically, the contact 108 is arranged to be adjusted through a suitable mechanical linkage 109 by the output of a telemetering receiver 110 which receives from Plant 1 a signal representative of the phase angle between the bus voltage of Plant 1 and some arbitrary reference voltage. Thus, the receiver 110 is arranged to position the contact 108 along the resistor 102 in accordance with the phase angle between the Plant 1 bus voltage and the arbitrary reference. Similarly, the contact 208 is connected through a suitable mechanical linkage 209 to the output of a telemetering receiver 210 which receives from Plant 2 a signal representative of the phase angle between the Plant 2 bus voltage and said reference. Thus, receiver 210 positions the contact 208 along the resistor 202 in accordance with the value of the phase angle between the Plant 2 bus voltage and said reference.

By virtue of the operation of the receivers 110 and 210, the contacts 108 and 208 are positioned along their respective resistors 102 and 202 so that the distance between these two contacts is a function of the actual phase angle $\theta_{1-2}$ between the bus voltages of Plants 1 and 2. Specifically, the contacts 108 and 208 are adjusted so that the positional difference between them is maintained in proportion to the actual value in electrical degrees of the phase angle $\theta_{1-2}$, this angle being that by which the bus voltage at Plant 1 leads the bus voltage at Plant 2 as noted hereinbefore. Accordingly, a voltage or signal is produced between the contacts 108 and 208 which is proportional to the existing value of the incremental transmission loss ratio for Plants 1 and 2 as set forth in the above numerical expression for this ratio.

If desired, the contacts 108 and 208 can be positioned manually, in lieu of being positioned by the receivers 110 and 210, in accordance with values observed and reported between local voltages and a broadcast reference or from reported tie line flows and angle charts.

Summarizing the foregoing, the signal between the transformer contact 105 and the conductor 107, and hence the signal appearing across the resistors 102 and 202, is adjusted in accordance with the foregoing numerical expression of Equation 4 as a predetermined function of the constant $K_{1-2}$, and the slideware contacts 108 and 208 are positioned in proportion to the value of $\theta_{1-2}$. Accordingly, the value of the incremental transmission loss ratio signal produced between the contacts 108 and 208 varies as a straight line function of $\theta_{1-2}$ in accordance with the foregoing numerical loss ratio expression.

*Computation of Cost Ratio*

It will be remembered that the function of the computing section 100 is to compute the incremental transmission loss and the incremental generating cost ratios for Plants 1 and 2, and to compare these ratios in accordance with the foregoing economic balance comparison Equations 3 and 4 so as to produce a deviation signal representative of any deviation from economic balance between Plants 1 and 2. Since there has been described above the apparatus for computing the value of the incremental transmission loss ratio, and for producing between the contacts 108 and 208 a signal of a value proportional to the existing value of the incremental transmission cost ratio, the next apparatus to be described is that which computes the incremental generating cost ratio for Plants 1 and 2. This ratio appears as the left-hand term in each of the foregoing Equations 3 and 4.

The circuit portion of the section 100 which computes the value of the incremental generating cost ratio for Plants 1 and 2, and which provides an effect or signal proportional to the existing value of this ratio, appears in the lower left-hand portion of FIG. 1. This cost ratio computing portion includes a transformer 111, an adjustable plant output or load slidewire resistor 112 for Plant 1, a similar plant load slidewire resistor 212 for Plant 2, and an adjustable fuel cost ratio transformer 113. The transformer 111 has a secondary winding 114 and a primary winding 115 which is arranged to be energized from the same source of A.C. energizing voltage as that employed to energize the primary winding 103 of the transformer 101. Although it is not essential that the transformer windings 103 and 115 be energized from the same source, it is necessary that the energizing voltages applied to these two windings be proportional to one another and of the same phase angle.

For the purpose of providing a measure of the existing incremental generating cost for Plant 1, $dF_1/dP_1$, the slidewire resistor 112 is provided with an adjustable slider contact 116 which is arranged to be adjusted in accordance with the actual output of Plant 1. To this end, the contact 116 is shown in FIG. 1 as being arranged to be adjusted through a suitable mechanical linkage 117 by the output of a telemetering receiver 118 which receives an input representative of the actual output of Plant 1. Similarly, a slider contact 216 which is adjustable along the resistor 212 is provided for giving a measure of the existing incremental generating cost for Plant 2, $dF_2/dP_2$. Contact 216 is shown as being arranged to be adjusted through a suitable mechanical linkage 217 by the output of a telemetering receiver 218 which receives an input representative of the actual output of Plant 2.

The adjustable transformer 113 is provided as a means to permit the value of the ratio between the fuel costs for Plants 1 and 2 to be introduced into the incremental generating cost computations effected by the apparatus. To this end, the transformer 113 is provided with a first winding 119, a second winding 120, and a slider contact 121 which is adjustable along the winding 120 by means of a knob 122. The proper manual positioning of the knob 122 in accordance with the known, existing value of the fuel cost ratio for Plants 1 and 2 affects the corresponding proper positioning of the contact 121 along the winding 120 as necessary to introduce into the apparatus the proper compensation for the existing value of this fuel cost ratio.

To the end of providing the desired signal proportional to the existing value of the incremental generating cost ratio for Plants 1 and 2, the transformer secondary winding 114 is effectively connected across a series circuit including the winding 120 of the transformer 113 and an adjustable portion of the resistor 212. Specifically, the left-hand end terminal of the winding 114 is connected by a conductor 123 to the left-hand end terminal of the winding 120, while a tap on the winding 120 adjacent the right-hand end thereof is connected by a conductor 124 to the contact 216 of the resistor 212. The circuit is completed by a connection between the right-hand end terminal of the resistor 212 and the right-hand end terminal of the transformer secondary winding 114, this connection including a resistor 225 which provides an effect representative of the fixed component for the incremental generating costs of Plant 2.

Additionally, an adjustable portion of the resistor 112 is effectively connected across an adjustable portion of the transformer winding 120. Specifically, the contact 121 on the winding 120 is connected to the contact 116 of the resistor 112, while the left-hand end terminal of the latter is connected to the left-hand end terminal of the winding 120 through a resistor 125 which provides an effect representative of the fixed component of the incremental generating costs of Plant 1.

Finally, an output conductor 126 for this cost computing portion of the apparatus is connected through the winding 119 of the transformer 113 to the conductor 124, while a second output conductor 127 is connected to the right-hand end terminal of the transformer secondary winding 114. As shown, the connection of the transformer winding 119 into the circuit is such as to provide the proper phasing between the voltage across the winding 119 and the voltage between the conductors 124 and 127 required to permit the transformer 113 to introduce its effect which is adjustable in accordance with the actual value of the fuel cost ratio for Plants 1 and 2.

By virtue of the foregoing structure and connections, the voltage or signal supplied by the transformer secondary winding 114 is modified by the resistors 112 and 212 so as to be a function of the existing loads on Plants 1 and 2, the extent of this modification being determined by the adjusted positions of the contacts 116 and 216. The resulting signal is modified further by the transformer 113 so as to be a function of the existing ratio between the fuel costs at Plants 1 and 2, the extent of this modification being determined by the adjusted position of the contact 120. As a result, there is produced between the output conductors 126 and 127 a signal of a value which is proportional to the existing value of the incremental generating cost ratio term of balance Equations 3 and 4.

Summarizing the foregoing, a supply voltage of a value proportional to that applied to the primary winding 103 of the transformer 101 is supplied by the secondary winding 114 of the transformer 111 to the adjustable plant output resistors 112 and 212, the fixed resistors 125 and 225, and to the adjustable transformer 113. The contacts 116 and 216 of the respective plant output resistors 112 and 212 are continuously positioned in accordance with the actual loading of the corresponding Plants 1 and 2, these adjusted resistors together with the fixed resistors 125 and 225 representing the respective variable and fixed components of the incremental generating costs for Plants 1 and 2. The contact 121 on the winding 120 of the transformer 113 is positioned in accordance with the existing value of the ratio between the fuel costs for Plants 1 and 2. As a result, a signal is produced between the conductors 126 and 127 which is proportional to the existing value of the difference between the incremental generating costs of the two plants divided by the sum of these generating costs, and which is therefore proportional to the existing value of the incremental generating cost ratio term of economic balance comparison Equations 3 and 4.

As was explained above, the adjustable plant output or load slidewire resistors 112 and 212 have their respective contacts positioned in accordance with the actual outputs of the corresponding Plants 1 and 2 so as to introduce into the apparatus the actual generating cost for each given value of load on each plant. Therefore, it is usually desirable to characterize each of the resistors 112 and 212 in accordance with the input-output characteristic of the corresponding plant.

It is believed that it will be readily apparent from the foregoing that the circuit portion just described is so constructed and arranged as to produce between the conductors 126 and 127 a signal or voltage which is proportional to the existing value of the incremental generating cost ratio term of Equations 3 and 4:

$$\frac{dF_2/dP_2 - dF_1/dP_1}{dF_2/dP_2 + dF_1/dP_1}$$

However, it will now be shown mathematically that this is true.

To this end, let the signals or voltages between the following conductors and points be designated as follows:

$$127 \text{ to } 126 = E_{127-126}$$
$$123 \text{ to } 116 = E_{123-116}$$
$$216 \text{ to } 127 = E_{216-127}$$
$$123 \text{ to } 127 = E_{123-127}$$
$$123 \text{ to } 216 = E_{123-216}$$

Then:
$$E_{123-116} = dF_1/dP_1 \qquad (5)$$
and
$$E_{216-127} = dF_2/dP_2, \qquad (6)$$

in accordance with the foregoing explanations.

Assuming first that the fuel cost ratio for Plants 1 and 2 has the value on the basis of which the plant input-output characterization of the resistors 112, 125, 212, and 225 was determined, and hence that the contact 121 is resting at the point on the winding 120 to which the conductor 124 is connected, then:

$$E_{123-127} = E_{216-127} + E_{123-116} \qquad (7)$$

In view of the relationships expressed by Equations 5, 6, and 7, unit voltage supplied by the winding 114 will be so divided that the voltage $E_{123-127}$ represents:

$$dF_2/dP_2 + dF_1/dP_1 \qquad (8)$$

Assuming also that the transformer 113 has unity ratio between the winding 119 and the portion of the winding 120 which is connected between the conductors 123 and 124, the following will be true:

$$E_{127-126} = dF_2/dP_2 - dF_1/dP_1 \qquad (9)$$

Also, by virtue of the fact that the voltage expression at (8) represents unit voltage. $E_{127-126}$ of Equation 9 can be expressed by the ratio:

$$\frac{dF_2/dP_2 - dF_1/dP_1}{dF_2/dP_2 + dF_1/dP_1}$$

times the unit voltage supplied by the winding 114, as is desired.

Assuming secondly that the fuel cost ratio for Plants 1 and 2 has a value FCR which is different from that assumed above, and which is such that:

$$(FCR)(dF_2/dP_2) = dF^1{}_2/dP_2 \qquad (10)$$

and that, as a result, the contact 121 is positioned at a point on the winding 120 to the left of the original point, such that:

$$E_{123-116} = (FCR)(E_{123-216})$$

then:

$$E_{123-216} = \frac{dF_1/dP_1}{FCR} \qquad (11)$$

Then, $E_{123-127}$ represents:

$$E_{216-127} + E_{123-216}$$

or $$dF_2/dP_2 + \frac{dF_1/dP_1}{FCR} \qquad (12)$$

in view of Equations 6 and 11.
Also:

$$E_{127-126} = E_{216-127} - E_{123-216}$$

$$= dF_2/dP_2 - \frac{dF_1/dP_1}{FCR} \qquad (13)$$

Thus, in view of Equations 12 and 13, $E_{127-126}$ can be expressed by the ratio:

$$\frac{dF_2/dP_2 - \dfrac{dF_1/dP_1}{FCR}}{dF_2/dP_2 + \dfrac{dF_1/dP_1}{FCR}}$$

$$= \frac{(FCR)(dF_2/dP_2) - dF_1/dP_1}{(FCR)(dF_2/dP_2) + dF_1/dP_1}$$

$$= \frac{dF^1{}_2/dP_2 - dF_1/dP_1}{dF^1{}_2/dP_2 + dF_1/dP_1}$$

in view of Equation 10.

Accordingly, the voltage between the conductors 126 and 127 represents the existing value of the incremental generating cost ratio term of Equations 3 and 4 for the original or modified value of the fuel cost ratio for Plants 1 and 2, as is desired.

Since the cost for generating a given output at a given plant, and hence the plant input-output characteristic, usually depends in practice upon the number of generators in the plant which are operating to supply this output, it may be desirable to provide each of the slidewire resistors 112 and 212 with a range switch, not shown, which will permit the characterization of the resistor to be adjusted in accordance with the number of generators which are contributing to the output of the corresponding plant at that time. Alternatively, the single load resistor shown for each plant may be replaced by a plurality of slidewire resistors, not shown, each of which corresponds to a respective one of the generators located at the corresponding plant and is characterized in accordance with the input-output characteristic of each corresponding generator. If this is done, suitable range switches, not shown, can be used to cut each of these resistors in and out of the computer circuit as the corresponding generators are put in and out of load service at the corresponding plant.

As explained above, the resistors 125 and 225 are included in the incremental generating cost ratio computing portion of the apparatus for the purpose of causing the incremental generating cost effects developed therein to include the effect of the fixed components of the incremental generating costs at the plants. Since this fixed component cost factor for a given plant may vary with the number of generators in operation at the plant, it may be desirable to make each of the resistors 125 and 225 adjustable. This will permit the fixed component cost effect in the computer to be changed, as required, in accordance with changes in the number of generators actively supplying load at the corresponding plant.

It is noted that the plant output slideware contacts 116 and 216 may be adjusted by means which is of a different character from the telemetering receivers 118 and 218 if desired. Thus, these contacts may be set manually, if desired, in accordance with prearranged generating schedules.

Also, if desirable, the contact 121 of the adjustable fuel cost ratio transformer 113 can be arranged to be adjusted automatically and/or from a remote location instead of manually as shown. This applies also for the adjustable contact 105 of the transformer 101 in the loss ratio computing portion of the section 100.

*Comparison Between Loss and Cost Ratios*

To the end of effecting the desired comparison between the values of the incremental transmission loss and incremental generating cost ratios for Plants 1 and 2, computed as described above, the outputs of the loss ratio and cost ratio portions of the section 100 are interconnected so as to effect a comparison between the magnitudes of the loss ratio and cost ratio effects or signals produced respectively by said portions. Specifically, the output contact 108 of the loss ratio computing portion is directly connected to the output conductor 126 of the cost ratio computing portion, while the output contact 208 of the loss ratio computing portion is connected to a deviation signal output conductor 128. Finally, the remaining output conductor 127 of the cost ratio computing portion is connected to a deviation signal output conductor 129.

By virtue of the foregoing connections, there is applied in series opposition between the output conductors 128 and 129 of the section 100 the loss and cost ratio signals produced by the apparatus. Specifically, the incremental transmission loss ratio signal proportional to the value of the right-hand term of balance Equations 3 and 4 is opposed between the output conductors 128 and 129 to the incremental generating cost ratio signal proportional to the left-hand term of those balance equations. Consequently, there is produced between the output conductors 128 and 129 of the section 100 a deviation effect or signal which is representative of the extent and direction of any difference between the values of the loss and cost signals and between the values of the loss and cost ratios for Plants 1 and 2, and of any deviation from economic balance between the incremental transmission losses and incremental generating costs for Plants 1 and 2. Thus, this deviation signal is representative of the extent and direction of deviation from economic balance between Plants 1 and 2.

It is clear from the foregoing that when Plants 1 and 2 are in economic balance, the incremental transmission loss and generating costs of these plants are in balance, Equations 3 and 4 are satisfied, the loss ratio signal between terminals 108 and 208 is equal and opposite to the cost ratio signal between conductors 126 and 127, and there is a zero deviation signal between output conductors 128 and 129. Under this condition, the incremental delivered energy costs for Plants 1 and 2 are equal, and these plants are economically loaded relative to each other.

However, when Plants 1 and 2 are not in economic balance, and hence do not have equal incremental costs of delivered energy, the balance equations are not satisfied, since the incremental generating cost and transmission loss ratios for the plants are not equal to each other. Under this condition, there is produced between output conductors 128 and 129 a deviation-from-balance signal of a magnitude and direction or phase sense which are respectively representative of each of the following:

(1) The extent and direction of deviation from economic balance between Plants 1 and 2.

(2) The amount and direction of the difference between the incremental costs of delivered energy for Plants 1 and 2.

(3) The extent and direction of the departure from the most economic loading for Plants 1 and 2.

(4) The approximate amount and the direction by which the output of Plant 2 should be changed relative to that of Plant 1 in order to return the plants to economic balance and operation with equal incremental costs of delivered energy.

Accordingly, a value of other than zero for the deviation signal produced between the output conductors 128 and 129 indicates a need for adjustment between the generation or outputs of Plants 1 and 2 in order to provide the most economic loading and operation of these two plants, and also indicates the approximate amount and the direction of the needed generation change.

In order to provide a suitable visual indication of the magnitude and direction of the deviation signal produced between the output conductors 128 and 129, to provide for the assigning of the plant loads in accordance with the indicated value of this signal, and hence in accordance with the relative incremental costs of delivered energy for Plants 1 and 2, a suitable indicator 130 is shown connected between these output conductors. This indicator may desirably be in the form of a zero-center A.C. voltmeter, polarized from the same source which is used to supply the transformer windings 103 and 115. Also, as will be discussed in detail hereinafter, the deviation signal produced between the conductors 128 and 129 may be utilized to control the plant outputs directly in response to the incremental delivered energy costs for the plants.

*Description of Sections 200 and 300*

There has been previously described herein the manner in which the computing section 100 is constructed and arranged to be operative to provide between its output conductors 128 and 129 a deviation signal having a magnitude and sense which are respectively representative of the extent and direction of departure from the most economic loading between Plants 1 and 2, and of the amount and direction which the output of Plant 2 should be changed relative to that of reference Plant 1 in order to obtain economic balance between these two plants. In the same manner as that described for section 100, section 200 is operative to produce between its output terminals 228 and 229 a deviation signal having a magnitude and sense which are respectively representative of the amount and direction by which the output or generation of Plant 3 should be changed relative to that of reference Plant 1 in order to obtain economic balance between Plants 1 and 3. Similarly, section 300 is operative, upon a departure from economic balance between Plants 1 and 4, to produce between its output conductors 328 and 329 a deviation signal having a magnitude and sense which are respectively representative of the amount and direction which the generation of Plant 4 should be changed relative to that of reference Plant 1 in order to obtain economic balance between Plants 1 and 4. These respective deviation signals are produced by the sections 200 and 300 in the same manner as that in which the section 100 produces its deviation signal, this identical operation being achieved by the inclusion in the sections 200 and 300 of components and circuitry which are duplicates of the components and circuitry included in the section 100.

Specifically, the section 200 includes an adjustable transformer 201 whose primary winding 203 is arranged to be connected to a suitable source of A.C. energizing voltage. While this source may conveniently be the same source which supplies energizing voltage to the primary windings of the transformers 101 and 111 in the section 100, it is not necessary that the sections 100, 200, and 300 be energized from the same source. Section 200 also includes a knob 206 to permit the contact 205 of the transformer 201 to establish a signal in accordance with Equation 4 as a function of the actual value of the constant $K_{1-3}$ for Plants 1 and 3.

The section 200 also includes adjustable phase angle resistors 102' and 302 having respective contacts 108' and 308 which are jointly positioned in proportion to the value in electrical degrees of the phase angle $\theta_{1-3}$ between the bus voltages of the Plants 1 and 3. To this end, the contact 108' is adjusted through the linkage 109 by the receiver 110 for the bus voltage phase angle of Plant 1, while the contact 308 is adjusted through a linkage 309 by a receiver 310 for the bus voltage phase angle of Plant 3.

Accordingly, there is produced in the output of the incremental transmission loss computing portion of the section 200, between the contacts 108' and 308, an incremental transmission loss ratio signal for Plants 1 and 3 which varies as a straight line function of $\theta_{1-3}$ in accordance with the right-hand term of Equation 4.

The lower, incremental generating cost ratio computing portion of section 200 includes an energizing transformer 211, adjustable plant output resistors 112' and 312 for Plants 1 and 3, respectively, and a fuel cost ratio transformer 213. The primary winding 215 of the transformer 211 is arranged to be energized from the same source which energizes the primary winding 203 of the transformer 201.

The contact 116' of the Plant 1 output resistor 112' is arranged to be positioned through the linkage 117 by the receiver 118 for the actual output of Plant 1. Similarly, the contact 316 of the output resistor 312 for Plant 3 is positioned through a linkage 317 by a receiver 318 for the actual output of Plant 3. The transformer contact 221 of the transformer 213 is arranged to be adjusted by a knob 222 in accordance with the existing value of the fuel cost ratio for Plants 1 and 3.

By virtue of the foregoing, there is produced between the output conductors 226 and 227 for the incremental generating cost ratio computing portion of section 200 a signal of a value which is proportional to the incremental generating cost ratio for Plants 1 and 3. This signal is compared with the incremental transmission loss ratio signal produced between the contacts 108' and 308 to produce between the section output conductors 228 and 229 the deviation signal representative of deviation from economic balance between Plants 1 and 3. An indicator 230 is connected between the output conductors 228 and 229 to indicate the magnitude and sense of this deviation signal.

In like manner, the section 300 includes energizing transformers 301 and 311, energized from the same or proportional voltage sources, a knob 306 for adjusting the output of the transformer 301 in accordance with the predetermined function of the value of the constant $K_{1-4}$ for Plants 1 and 4, and resistors 102" and 402 whose contacts 108" and 408 are jointly positioned in proportion to the phase angle $\theta_{1-4}$ between the bus voltages of Plants 1 and 4. Further, section 300 includes plant output resistors 112" and 412 which are respectively adjusted in accordance with the outputs of Plants 1 and 4. Section 300 also includes an adjustable transformer 313 and a knob 322 for adjusting this transformer in accordance with the value of the fuel cost ratio for Plants 1 and 4. Suitable telemetering receivers 410 and 418 respectively supply the section 300 with effects representative of the bus voltage phase angle of Plant No. 4 and the actual output of Plant No. 4. In accordance with the operation of the foregoing elements in the section 300, the latter provides between its output conductors 328 and 329 the aforementioned deviation signal representative of any deviation from economic balance between Plant 4 and reference Plant 1. An indicator 330 connected between the output conductors 328 and 329 provides an indication of the magnitude and sense of this deviation signal.

It is noted that the primed reference characters appearing herein denote elements which correspond to the respective elements bearing the same but unprimed reference characters, this system of notation being used where two or more sets of corresponding elements are individual to a given plant but are included in two or more adjacent sections. For example, the corresponding phase angle resistors 102, 102', and 102" are all individual to Plant 1, but are located in the circuitry of sections 100, 200, and 300, respectively.

*Typical Use and Operation of the FIG. 1 Apparatus*

As will be clear from the foregoing description, the FIG. 1 apparatus is an arrangement for detecting deviation from economic balance between pairs of the system plants, each pair consisting of a reference plant and another of the system plants, and for assigning the loads to the system plants in accordance with the incremental costs of delivered energy for the plants so as to secure the most economical loading of the plants, and the most economical operation of the system. To this end, the apparatus includes the above-described economic balance deviation computing or detecting and indicating portions which provide the foregoing indications of deviation from economic balance between reference Plant 1 and each of the other system Plants 2, 3, and 4. As noted above, these indicated deviations represent several quantities, notably the extent and direction of deviation from balance and from the most economical loading of Plants 2, 3, and 4 with respect to reference Plant 1, and the relative incremental cost of delivered energy for Plants 1, 2, 3, and 4. Also, the magnitudes and senses of these indicated deviation signals respectively represent approximate amounts and directions that the generation of Plants 2, 3, and 4 should be changed with respect to Plant 1, in order to obtain the desired optimum plant loading combination and economic system operation.

Therefore, in the use of the FIG. 1 apparatus for assigning the loads to Plants 2, 3, and 4 on an economic basis, the deviation indications provided by the indicators 130, 230, and 330 of the apparatus are advantageously utilized as the basis on which to instruct the operators of Plants 2, 3, and 4 as to how they should load their plants at any given time in order to maintain economic system operation under the existing conditions.

Specifically, in such typical use in operation of the FIG. 1 apparatus, the indication provided by each of the deviation indicators 130, 230, and 330 is observed as necessary, and the corresponding plant is instructed, as by telephone or telemetering, to raise or lower its generation or output as dictated by the magnitude and sense of any deviation appearing on the corresponding indicator, the extent of the total load change requested being that required to reduce the corresponding deviation substantially to zero.

For example, when all of the indicators indicate substantially zero deviations, all plants are loaded economically and are in economic balance, and the system operates in the most economical manner. An indication of other than zero on any indicator, however, shows a departure from economic balance and a need for adjustment of the output of the corresponding plant, relative to Plant 1, in order to reinstate balance. Thus, upon a system load or other change which temporarily destroys the economic balance and load division of the system, deviation indications appear on the indicators and indicate which plants need to have their generation raised or lowered, with respect to Plant 1, in order to restore economic operation. These indications also represent the direction and approximate magnitude of the needed generation changes.

Upon the appearance of such deviation indications, the necessary plants are instructed, on the basis of the magnitudes and directions of the indications, to change their generation or outputs in the required direction. These adjustments in the generation between the plants are continued, preferably starting first with the plant exhibiting the greatest deviation, until all of the deviations and their indications have been reduced substantially to zero, at which time economic balance and economic system operation will have been restored.

Therefore, the FIG. 1 apparatus is operative to assign the loads to the system plants in accordance with their incremental cost of delivered energy, and according to the optimum or most economic generating or loading schedule for the existing system load conditions. Thus, the plant loads are assigned by the apparatus in such a manner as to provide the most economical operation of the system under the various operating conditions thereof. It is obvious that, when Plants 2, 3, and 4, are in economic balance with Plant 1, all possible pairs of the system plants, and hence the entire system, are in economic balance.

As was noted hereinbefore, the construction and arrangement of the foregoing apparatus according to the present invention makes it unnecessary that the Plants 2, 3, and 4 be electrically adjacent to reference Plant 1. This feature of being able to compare directly and accurately plants which are widely separated electrically and have intervening generation between them is achieved by the apparatus of the present invention on the basis of the foregoing two-step method of incremental transmission loss computation.

It is usually desirable to locate the FIG. 1 load assigning apparatus at a point at which the apparatus can conveniently be supplied with the bus voltage phase and output data for each plant, as by means of telemetering as illusstrated, and from which each plant can conveniently be sent instructions as to the magnitude of the load it is to carry in order to provide economical system operation. In some cases, it may be desirable to locate the FIG. 1 apparatus adjacent to reference Plant 1, while in other cases it may be more desirable to locate the apparatus adjacent to one of the other plants of the system, or at a point which is centrally disposed with respect to all of the plants. In each case, the most desirable location will depend on a number of factors, including the configuration of the particular system involved.

The Modification of FIG. 2

There is shown in FIG. 2 a modified form of the incremental generating cost ratio computing portion of the section 100 of the FIG. 1 apparatus. The form of incremental generating cost ratio computing circuit shown in FIG. 2 is operative to provide an output signal which is proportional to the value of the incremental generating cost ratio or left-hand term of the foregoing single-step economic balance comparison Equations 1 and 2. Therefore, the circuit of FIG. 2 may be used in section 100 of the FIG. 1 apparatus, in place of the incremental generating cost ratio portion shown in FIG. 1, in those cases mentioned above where Plants 1 and 2 are connected by a relatively long transmission path with no intervening generation, and hence where the use of the single-step balance equations instead of the two-step balance equations is dictated. Although the FIG. 2 arrangement has been illustrated as being used in section 100 of the FIG. 1 apparatus, it is noted that the FIG. 2 arrangement could be substituted into any or all of the sections 100, 200, and 300, depending upon the relationship between reference Plant 1 and the corresponding plant of the section.

As shown by the foregoing single-step balance comparison Equations 1 and 2, the output of the incremental generating cost ratio computing circuit of FIG. 2, appearing between the output conductors 126 and 127 of the portion, is required to be a signal of a value which is proportional to the value of the difference between the incremental generating costs of Plants 1 and 2 divided by the incremental generating cost of Plant 2. To this end, the FIG. 2 arrangement includes an adjustable autotransformer 231 which replaces the Plant 2 output resistor 212 of FIG. 1. The transformer 231 has a winding 232 and a contact 233 which is positioned along the winding 232 through the linkage 217 by the receiver 218 in accordance with the actual output of Plant 2.

The FIG. 2 arrangement also includes an adjustable autotransformer 234 which replaces the fuel cost ratio transformer 113 of FIG. 1. The autotransformer 234 has a winding 235 and a contact 236 which is positioned along the winding 235 by the knob 122 in accordance with the actual value of the fuel cost ratio for Plants 1 and 2.

To the end of providing the foregoing signal proportional to the value of the incremental generating cost ratio for Plants 1 and 2 in accordance with Equations 1 and 2, the left-hand end terminal of the winding 232 of the Plant 2 output autotransformer 231 is connected to the left-hand end terminal of the secondary winding 114 of the energizing transformer 111, while the contact 233 of the autotransformer 231 is connected to the right-hand terminal of the secondary winding 114. Also, the right-hand end terminal of the winding 232 of the autotransformer 231 is connected to a tap on the winding 235 of the fuel cost ratio autotransformer 234 at a point adjacent the right-hand end of the winding 235. Additionally, the left-hand end terminal of the winding 235 is connected to the left-hand end terminal of the secondary winding 114.

The contact 236 of the autotransformer 234 is connected to the left-hand end terminal of its winding 235 through the output and fixed cost component resistors 112 and 125 for Plant 1, the contact 116 of the resistor 112 being adjusted along the latter by the receiver 118 in accordance with the actual output of Plant 1 as before. Finally, the output conductor 126 of the portion is connected to the contact 116, while the output conductor 127 is connected to the right-hand end terminal of the secondary winding 114.

It is believed that it will be readily apparent from the foregoing that the FIG. 2 circuit portion just described is so constructed and arranged as to produce between the conductors 126 and 127 a signal or voltage which is proportional to the existing value of the incremental generating cost ratio term of Equations 1 and 2:

$$\frac{dF_2/dP_2 - dF_1/dP_1}{dF_2/dP_2}$$

However, it will now be shown mathematically that this is true.

To this end, let the signal or voltage between the unnumbered left-hand vertical conductor and the vertical conductor connected to the right-hand end terminal of the winding 232 be designated as $E_1$, the voltage between said unnumbered conductor and the contact 116 be designated as $E_2$, and the voltage between the conductors 126 and 127 be designated as $E_{126-127}$. Then, for unit voltage supplied by the winding 114:

$$E_1 = \frac{1}{dF_2/dP_2}$$

Assuming that the fuel cost ratio for Plants 1 and 2 has its design value, and hence that the contact 236 is resting at the tap on the winding 235:

$$E_2 = (E_1)(dF_1/dP_1)$$
$$= \frac{dF_1/dP_1}{dF_2/dP_2}$$

Since, for unit supply voltage:

$$E_{126-127} = 1 - E_2$$

then:

$$E_{126-127} = 1 - \frac{dF_1/dP_1}{dF_2/dP_2}$$
$$= \frac{dF_2/dP_2 - dF_1/dP_1}{dF_2/dP_2}$$

as is desired.

When the fuel cost ratio for Plants 1 and 2 has a value other than the design value assumed above, the proper positioning of the contact 236 in accordance with this value will result in the production of the correct generating cost ratio voltage between the conductors 126 and 127 corresponding to this modified value of the fuel cost ratio. This can be shown in a similar manner to that given hereinbefore in connection with the mathematical explanation of the operation of the corresponding circuit portion of the FIG. 1 apparatus.

By virtue of the construction and circuitry thus described, the FIG. 2 arrangement is operative to produce between the conductors 126 and 127 a signal of a value proportional to the existing value of the difference between the incremental generating cost for Plant 2 and the incremental generating cost for Plant 1, all divided by the incremental generating cost for Plant 2. When the FIG. 2 computing portion is included in one of the sections 100, 200, and 300, the signal just described will be equal and opposite to the output signal of the corresponding incremental transmission loss ratio computing portion when the two plants involved are in economic balance. To this end, a section utilizing the FIG. 2 arrangement for its incremental generating cost ratio computing portion, and hence operating in accordance with the single-step economic balance equations, will have its corresponding knob 106, 206, etc. adjusted as a function of the corresponding constant K in accordance with the right-hand term of Equation 2 as set forth hereinbefore. Thus, the incremental transmission loss ratio signal produced by such a section will vary as a straight line function of the phase angle between the two plants involved in accordance with the right-hand term of Equation 2.

*The Automatic Load Control Arrangement of FIG. 3*

As was mentioned hereinbefore, the balance deviation voltages or signals produced by the apparatus can, if desired, be utilized to control the generation and outputs of the plants automatically as necessary to maintain the most economic operation of the system. Thus, as was noted previously herein, the deviation signals produced by the sections 100, 200, and 300 appear between the respective output conductors for the sections, which conductors can be employed to apply these deviation signals to a suitable device for automatically controlling the plant outputs in accordance with the signals.

The manner in which such plant load control device can be combined with the FIG. 1 apparatus to provide automatic economic control of the plant loadings is illustrated in FIG. 3. Thus, there is shown therein a plant load or output control device 137 which is arranged to receive the deviation output signals from the FIG. 1 apparatus and to apply suitable generation or load control signals to the plants for controlling the plant generation in accordance with the deviation signals and in such a manner as to maintain these signals as close as possible to zero, and hence maintain the most economical loading and operation of the system.

As an example of a suitable form of plant generation controlling apparatus for use with the FIG. 1 apparatus, the device 137 of FIG. 3 has been shown as being of the type which controls the generation and load outputs of the plants by supplying to the plants controlled quantities of generation raising and lowering impulses. Each plant which is to receive and be controlled by such impulses is arranged, in the well known manner, to increase its generation and output as long as it receives raising impulses from the control apparatus, and to decrease its generation and output as long as it receives lowering impulses from the control apparatus.

To this end, the generation control impulse assigning apparatus or controller 137 of FIG. 3 is shown as being supplied with the deviation signals from the FIG. 1 apparatus by means of the output conductors 128, 129, 228, 229, 328, and 329, which conductors are shown connecting the FIG. 1 apparatus output to the controller input. The controller 137 is also shown as receiving a supply of generation raising impulses, by way of a connection 138, and a supply of generation lowering impulses, by way of a connection 139, from a suitable source, not shown. In the well known manner for apparatus controlling plant generation by means of such impulses, the impulses supplied to the controller from said source may well be so supplied only under system conditions which require a change in generation in the system, the supplied impulses advantageously being of the usual type occurring at regular intervals but having a duration which is related to the magnitude of said required change. Additionally, the controller 137 is shown as receiving, by way of a connection 140, an effect indicative of deviation from scheduled conditions within the system. This effect may, for example, represent a departure of the actual system frequency from the desired system frequency, and/or a departure of an actual tie line load from a scheduled tie line load.

The controller 137 is also shown as having a plurality of output connections 141 through 148, from which the generation raising and lowering impulses are sent, as by means of telemetering, to the several Plants 1 through 4 under the control of the deviation signals applied to the controller. Thus, each of the plants can be supplied with both raising and lowering impulses, as dictated by the load assigning apparatus of FIG. 1 through the medium of the deviation signals applied to the controller 137.

As an example of the typical operation of the arrangement as just described, let it be assumed that the controlled system is operating in the most economical manner, with no need for change or reallocation of the plant generation. Under this condition, there are no impulses supplied to the controller 137, no deviation signals to be supplied thereto, and therefore no impulses sent out to the plants.

Upon the occurrence of conditions which temporarily destroy the economic balance of the system, and which require a change to be effected in the system generation, suitable impulses are supplied to the controller 137 over the connections 138 and 139, as are the appropriate deviation signals over the corresponding ones of the conductors 128, 129, etc. Also, a suitable effect indicative of deviation from schedule may be supplied to the controller 137 over the connection 140. The controller is then operative to assign the appropriate impulses to the plants whose generation and outputs are to be changed as determined and dictated by the deviation signal. Such impulses are so assigned and supplied to the plants until the desired system operation is obtained, and economic loading and balance are restored.

*The Modification of FIG. 4*

As previously noted herein, the plant bus voltage phase angle effects or data supplied to the apparatus may, if desired, be supplied by a simplified network analyzer instead of being obtained directly from the plants as shown in FIG. 1. To this end, there is shown in FIG. 4 a portion of a modification of the FIG. 1 arrangement wherein the phase angle data telemetering connections and the telemetering receivers 110, 210, 310, and 410 are replaced by a typical network analyzer 149 which is set up in the well known manner to simulate the actual system including the Plants 1 through 4. Accordingly, there can be and are obtained from appropriate points in the simulated system of the analyzer signals having phases representative of the actual phases of the plant bus voltages in the actual system, which signals can be converted to mechanical adjustments to be applied to the FIG. 1 apparatus over the linkages 109, 209, 309, and 409.

Specifically, the analyzer 149 is shown in FIG. 4 as being supplied with the usual data necessary to cause the simulated system of the analyzer to simulate the actual system dynamically as well as statically. Thus, data as to the existing values of the actual plant loads or outputs is supplied to the simulated system of the analyzer by a connection 150, this data being obtained, for example, from the actual plant output data telemetered to the FIG. 1 apparatus. Also, data as to the constants of the actual system, such as transmission line impedances and load locations, is supplied to the analyzer 149 by a connection 151. Finally, data as to the actual, existing system loads is supplied to the analyzer 149 by a connection 152.

It is to be understood that the foregoing arrangements for supplying data to the simulated system of the analyzer, and the particular data supplied thereby, are disclosed herein merely by way of example for the purpose of illustrating the typical use of a typical analyzer as a source of the phase angle data needed by the FIG. 1 apparatus. Accordingly, it is noted that the analyzer could be supplied with whatever data and in whatever manner necessary or convenient for the particular conditions involved in any given case.

To the end of supplying adjustments to the resistors 112, 212, etc. in accordance with the phase angle signals obtained from the simulated system of the analyzer and representing the actual plant bus voltage phase angles, the analyzer 149 adjusts the contacts of the corresponding resistors by means of the linkages 109, 209, 309, and 409. Accordingly, the contacts of the resistors 112, 212, etc. are suitably adjusted by the analyzer 149 in the same manner that they would be adjusted by the corresponding telemetering receivers shown in FIG. 1.

A form of network analyzer arranged to supply signals representative of the actual bus voltage phase angles of the plants of an actual, operating system is shown in detail of a copending application of mine, Serial No. 632,756 filed on even date herewith, now Patent No. 2,999,638.

*Conclusion*

By virtue of the use of the foregoing linearized economic balance comparison equations and method as the basis for the operation of the apparatus, the latter possesses many features of practical significance, as should be readily apparent in the light of the foregoing description. For example, such use permits the use of relatively simple apparatus in effecting the economic balance deviation detecting and deviation signal producing operations, and also permits the directly compared plants to be widely separated from one another. Also, the use of the phase angle method of incremental transmission loss computation makes the incremental transmission loss ratios computed by the apparatus independent of the relative or absolute magnitudes of the plant bus voltages, of the real power and reactive power ratios existing at the plants, of wide variations in load pattern, and of transmission line outages. Thus, the accuracy with which the incremental transmission losses are coordinated by the apparatus with the incremental generating costs in producing the deviation signals is substantially independent of:

(1) The magnitudes of the system loads;
(2) Extreme variations in system load pattern, due, for example, to strikes in industrial plants, etc.;
(3) Daily and seasonal variation in generated voltage levels and in the amount of normal voltage drop between plants and loads;
(4) Changes in phase angles in the system;
(5) The ratio of the real and reactive powers at various plants, and variations in these ratios; and
(6) The switching in and out of transmission lines.

It should be readily apparent from the foregoing that there has been provided novel apparatus for assigning the loads to the generating plants of a power system in accordance with their incremental costs of delivered energy, this apparatus utilizing plant bus voltage phase angles to compute incremental transmission loss ratios which are compared with incremental generating cost ratios, computed on the basis of fuel cost and plant loading information supplied to the apparatus, by means of novel balance comparison equations to provide comparison of the incremental generating costs and the incremental transmission losses for the plants. The results of these comparisons appear as deviation signals, these signals being functions of the amount that the generation of each plant should be raised or lowered with respect to a chosen reference plant in order to provide the most economical combination of plant loadings. These deviation signals are supplied to indicators and/or to automatic control equipment.

What is claimed is:

Apparatus for detecting deviation from economic balance between the interconnected generating plants of a power system, comprising an element arranged to have a voltage produced thereacross, first adjustable means for said element for producing between first and second conductors connected to said element a portion of the voltage across said element of a value dependent upon the adjustment of said first adjustable means, first and second voltage dividers connected in parallel between said conductors, a second adjustable means for said first divider for tapping off a portion of the voltage thereacross of a value dependent upon the adjustment of said second adjustable means, a third adjustable means for said second divider for tapping off a portion of the voltage thereacross of a value dependent upon the adjustment of said third adjustable means, first adjusting means for adjusting said first adjustable means to cause the value of the voltage between said second conductors to be a predetermined function of the value K of the ratio of the reactance to the resistance of the equivalent path interconnecting two of said plants according to the expression $$\frac{0.0184K}{K^2 + 0.17}$$

second adjusting means for adjusting said second adjustable means in accordance with the phase angle between the bus voltage of one of said two plants and a reference voltage, third adjusting means for adjusting said third adjustable means in accordance with the phase angle between the bus voltage of the other of said two plants and said reference voltage, said means producing between said second and third adjustable means an electrical loss signal of a value representing the incremental transmission loss ratio for said two plants and proportional to $$\frac{0.0184K}{K^2 + 0.17}\theta$$

where $\theta$ is the value of the phase angle between said bus voltages of said two plants in electrical degrees, an electrical network including third and fourth conductors forming the output of said network, an element arranged to have a voltage produced thereacross and connected in a circuit with said third and fourth conductors to produce a voltage between the latter, a first adjustable device connected in said circuit, fourth adjusting means for adjusting said first adjustable device to vary said voltage between said third and fourth conductors in accordance with the ratio of the costs of fuel for said two plants, a second adjustable device connected in said circuit, fifth adjusting means for adjusting said second adjustable device to vary said voltage between said third and fourth conductors in accordance with the actual output of said one plant, a third adjustable device connected in said circuit, sixth adjusting means for adjusting said third adjustable device to vary said voltage between said third and fourth conductors in accordance with the actual output of said other plant, said devices causing said voltage between said third and fourth conductors to be a cost signal of a value representing the incremental generating cost ratio for said two plants, the last mentioned value being substantially equal to the value of said loss signal between said second and third adjustable means when said two plants are in economic balance, and signal-comparison means connected in a series loop with said second and third adjustable means and said third and fourth conductors to compare said loss and cost signals and to produce a deviation signal proportional to any deviation between said loss and cost signals, and hence representative of any deviation from economic balance between said two plants.

References Cited in the file of this patent

UNITED STATES PATENTS

| | | |
|---|---|---|
| 2,366,968 | Kaufmann | Jan. 9, 1945 |
| 2,692,342 | Nichols et al. | Oct. 19, 1954 |
| 2,829,829 | Starr et al. | Apr. 8, 1958 |
| 2,836,730 | Early | May 27, 1958 |
| 2,841,331 | Starr et al. | July 1, 1958 |
| 2,861,197 | Brownlee | Nov. 18, 1958 |
| 2,866,102 | Cohn | Dec. 23, 1958 |

FOREIGN PATENTS

| | | |
|---|---|---|
| 553,947 | Great Britain | June 11, 1943 |

OTHER REFERENCES

AIEE Technical Paper 49-242 (George et al.), September 1949, 24 pages.

Proceedings of the IEE (Davis et al.), October 1953, pages 469-486.